United States Patent
Andriessen et al.

(10) Patent No.: US 11,257,264 B2
(45) Date of Patent: Feb. 22, 2022

(54) MAINTAINING DATA TRANSFORMATION GRAPHS

(71) Applicant: UiPath, Inc., New York, NY (US)

(72) Inventors: Ruud Andriessen, Eindhoven (NL); Roeland Johannus Scheepens, Eindhoven (NL)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 16/828,999

(22) Filed: Mar. 25, 2020

(65) Prior Publication Data

US 2021/0304466 A1 Sep. 30, 2021

(51) Int. Cl.
| | |
|---|---|
| *G06F 16/901* | (2019.01) |
| *G06F 16/22* | (2019.01) |
| *G06T 11/20* | (2006.01) |
| *G06F 30/20* | (2020.01) |
| *G06F 111/10* | (2020.01) |

(52) U.S. Cl.
CPC ........ *G06T 11/206* (2013.01); *G06F 16/2282* (2019.01); *G06F 16/9024* (2019.01); *G06F 30/20* (2020.01); *G06F 2111/10* (2020.01); *G06T 2200/24* (2013.01)

(58) Field of Classification Search
None
See application file for complete search history.

(56) References Cited

U.S. PATENT DOCUMENTS

| | | | |
|---|---|---|---|
| 8,452,723 B2 | 5/2013 | Belvyy et al. | |
| 9,202,052 B1* | 12/2015 | Fang | G06F 21/56 |
| 9,208,059 B2 | 12/2015 | Sanders | |
| 2014/0324751 A1* | 10/2014 | Roberts | G06Q 30/0269 |
| | | | 706/46 |
| 2016/0342656 A1* | 11/2016 | Dubost | G06F 16/2358 |
| 2018/0239767 A1* | 8/2018 | Bostick | G06F 16/4393 |
| 2020/0004749 A1* | 1/2020 | Slezak | G06F 16/2282 |

FOREIGN PATENT DOCUMENTS

EP 3535670 A1 9/2019

OTHER PUBLICATIONS

"Enterprise ETL Tools," retrieved online on Mar. 20, 202, from https://www.altova.com/mapforce/etl-tool, 9 pgs, Mar. 20, 2020.
"Azure Data Factory: Visual Data Flows for Data Transformation," retrieved online on Mar. 20, 2020 from https://kromerbigdata.com/2018/09/21/azure-data-factory-visual-data-flows-for-data-transformation-preview/, 14 pgs.
"CloverDX," retrieved online on Mar. 20, 2020, from https://www.cloverdx.com/product, 9 pgs.

(Continued)

*Primary Examiner* — Joni Hsu
(74) *Attorney, Agent, or Firm* — Chiesa Shahinian & Giantomasi PC

(57) ABSTRACT

Systems and methods for creating a unified model of a data transformation graph to facilitate maintenance of the data transformation graph are provided. A user model of a data transformation graph is received and stored for each of a plurality of users. Creation of a unified model of the data transformation graph is facilitated based on the user models. The unified model of the data transformation graph is displayed.

17 Claims, 8 Drawing Sheets

(56) References Cited

OTHER PUBLICATIONS

Balzer et al., "Level-of-detail Visualization of Clustered Graph Layouts," Asia-Pacific Symposium on Visualisation, Feb. 2007, APVIS 2007, Proceedings, 200, 8 pgs.
Sugiyama et al., "Visualization of Structural Information: Automatic Drawing of Compound Digraphs," IEEE Transactions on Systems, Man, and Cybernetics, vol. 21, No. 4, 1991, pp. 876-892, Aug. 19, 1991.
Bach et al., "Graphdiaries: Animated Transitions and Temporal Navigation for Dynamic Networks," Transactions on Visualization and Computer Graphics, vol. 20, No. 5, 2014, pp. 740-754, May 2014.
Cui et al., "Practical Lineage Tracing in Data Warehouses," Proceedings of 16th International Conference on Data Engineering, IEEE Comput. Soc, 2000, 21 pgs, Mar. 2000.
Cui et al., "Lineage Tracing for General Data Warehouse Transformation," International Journal on Very Large Data Bases, vol. 12, No. 1, 2003. 30 pgs, May 2003.
Herschel et al., "A Survey on Provenance: What for? What Form? What From?," VLDB Journal, vol. 26, No. 6, 2017, pp. 881-906, Dec. 2017.
Ko et al., "An Exploratory Study of How Developers Seek, Relate, and Collect Relevant Information During Software Maintenance Tasks," IEEE Transactions on Software Engineering, vol. 32, No. 12, 2006, pp. 971-987, Nov. 2006.

\* cited by examiner

MAINTAINING DATA TRANSFORMATION GRAPHS

TECHNICAL FIELD

The present invention relates generally to data transformation graphs, and more particularly to facilitating the maintenance of data transformation graphs.

BACKGROUND

The increasing pervasiveness of computers has resulted in the collection of large amounts of complex data, which may be used for various business related applications. In order to utilize such large amounts of complex data, large networks of transformations, referred to as data transformation graphs, are applied to the data to thereby transform the data into a suitable format or structure.

Often times, the required formats or structures of the data input into data transformation graphs and output from data transformation graphs may change. Such data transformation graphs must be maintained to account for the changing formats or structures of the input and output data. However, the maintenance of data transformation graphs is a cumbersome task that is prone to errors. Conventional tools for maintaining data transformation graphs are limited in their ability to identify errors. Accordingly, the maintenance of data transformation graphs typically relies on the domain experts who have developed the data transformation graphs due to their deep understanding of the data transformation graphs. However, domain experts and requirements of the data transformation graphs are constantly changing, making the maintenance of data transformation graphs challenging.

BRIEF SUMMARY OF THE INVENTION

In accordance with one or more embodiments of the present invention, systems and methods for creating a unified model of a data transformation graph to facilitate maintenance of the data transformation graph are provided. A user model of a data transformation graph is received and stored for each of a plurality of users. Creation of a unified model of the data transformation graph is facilitated based on the user models by displaying the user models. The unified model of the data transformation graph is displayed. Modification of the data transformation graph is facilitated based on the unified model.

In one embodiment, displaying the unified model of the data transformation graph includes displaying a column list of a table for a selected node of the unified model, a summary of information available in the table, data origin and data destination information of the table, and value frequencies of the table. In one embodiment, displaying the user models includes displaying a column list of a table for a selected node of the user models, a summary of information available in the table, data origin and data destination information of the table, and value frequencies of the table.

In one embodiment, the user model of the data transformation graph for each of the plurality of users is created based on user input from each of the plurality of users. The unified model may be created based on user input from one or more of the plurality of users.

These and other advantages of the invention will be apparent to those of ordinary skill in the art by reference to the following detailed description and the accompanying drawings.

DETAILED DESCRIPTION

Figure 1:
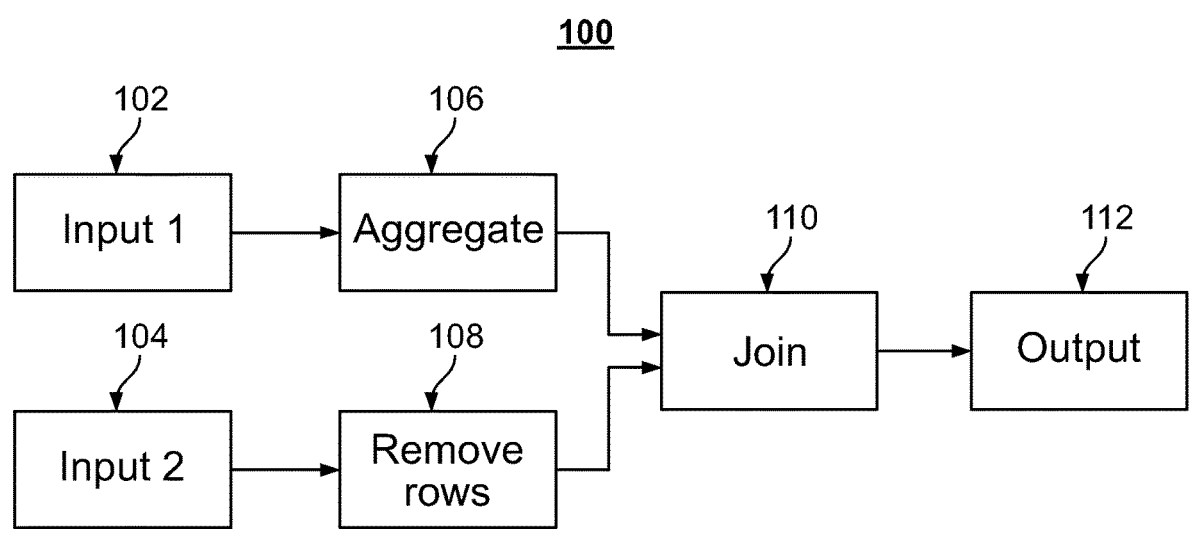
FIG. 1 shows an exemplary data transformation graph.

Often times, in order to utilize large amounts of complex data, companies (or any other entity) require that the data be in a particular format or have a particular structure. Accordingly, data transformation graphs are applied to transform the data into a particular format or structure. An exemplary data transformation graph 100 is shown in FIG. 1. Data transformation graph 100 is modelled as a directed acyclic graph having nodes 102-112, and edges representing the flow of data between nodes 102-112. Formally, data transformation graph 100 is denoted as data transformation graph G=(V,E) where each node n∈V represents a data operation and each edge (n, n')∈E indicates the flow of data from node n to node n'. In data transformation graph 100, transformation nodes 106-110 apply transformations to data received at input nodes 102-104 to generate data output at output node 112.

Input nodes 102-104 represent input data sources that exclusively produce data, such as, e.g., a database table or a file. Output node 112 represents an output data sink that exclusively consumes data, such as, e.g., a visualization or database table. Transformation nodes 106-110 apply one or more transformations to the data. The transformation performed by transformation nodes 106-110 may include structural transformations (e.g., adding or removing rows or columns of a table), merge and duplicate transformations (e.g., duplicating a row or column or merging multiple rows or columns into a single row or column of a table), content transformations (e.g., changing values of a cell in a table), order transformations (e.g., reordering rows or columns of a table), or any other suitable transformation.

As shown in FIG. 1, data transformation graph 100 receives input 1 at input node 102 and input 2 at input node 104, which are transformed by transformations nodes 106 and 108 to aggregate data and remove rows from data, respectively. The outputs of transformation nodes 106 and 108 are transformed by transformation node 110 to join the data and the joined data is output at output node 112.

At times, data transformation graph 100 may require maintenance due to, e.g., updated format and structural requirements. Such maintenance of data transformation graph 100 involves modifying data transformation graph 100, e.g., to generate output data according to the updated format and structural requirements. Advantageously, embodiments of the present invention provide for a user interface to facilitate the maintenance of data transformation graph 100.

Figure 2:
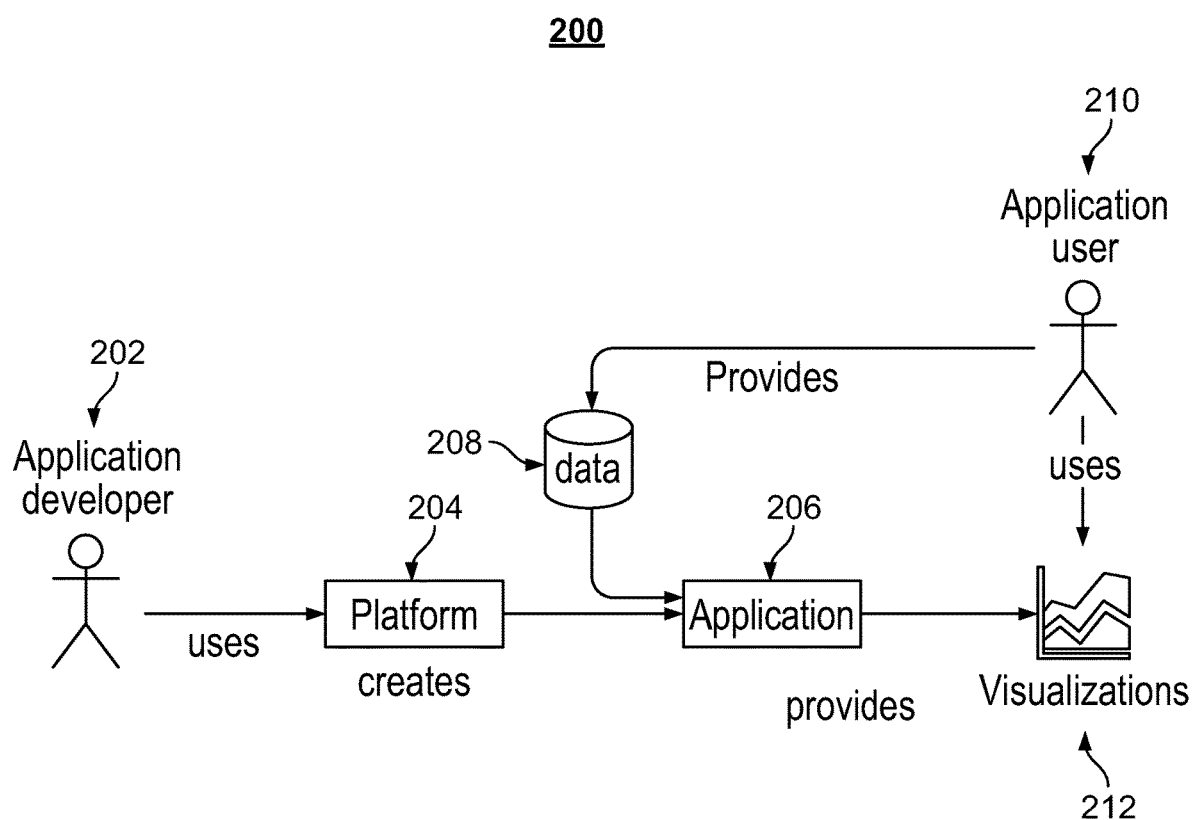
FIG. 2 shows a framework for implementing a system for maintaining data transformation graphs, in accordance with one or more embodiments of the invention.

FIG. 2 shows a framework 200 for implementing a system for maintaining data transformation graphs, in accordance with one or more embodiments. In framework 200, an application developer 202 uses a platform 204 to create an application 206 for providing a user interface to one or more application users 210. The user interface presents visualizations 212 relating to a data transformation graph. Application developer 202 is responsible for maintaining the data transformation graph. Application users 210 do not directly interact with the data transformation graph, but use visualizations 212 (e.g., by filtering and/or selection) to modify the data transformation graph. Application 206 is created using data 208 stored in a database (or any other data source). Data 208 comprises user models of the data transformation graph for each of the application users 210. A user model for a particular user is a user-specific representation of the data transformation graph as understood by the particular user. A user model may lack details or may be incomplete.

Embodiments of the present invention provide a user interface for enabling user interaction by application users 210 for creating and presenting user models in application 206 (e.g., by dragging and dropping nodes) and integrating the user models in the data transformation graph. Such presentation of user models enables application users 210 to verify their understanding of the data transformation graph and achieve a common understanding of the data transformation graph with other users based on visualizations 212. Application user 210 may also gain other insight on the data transformation graph from visualizations 212.

Figure 3:
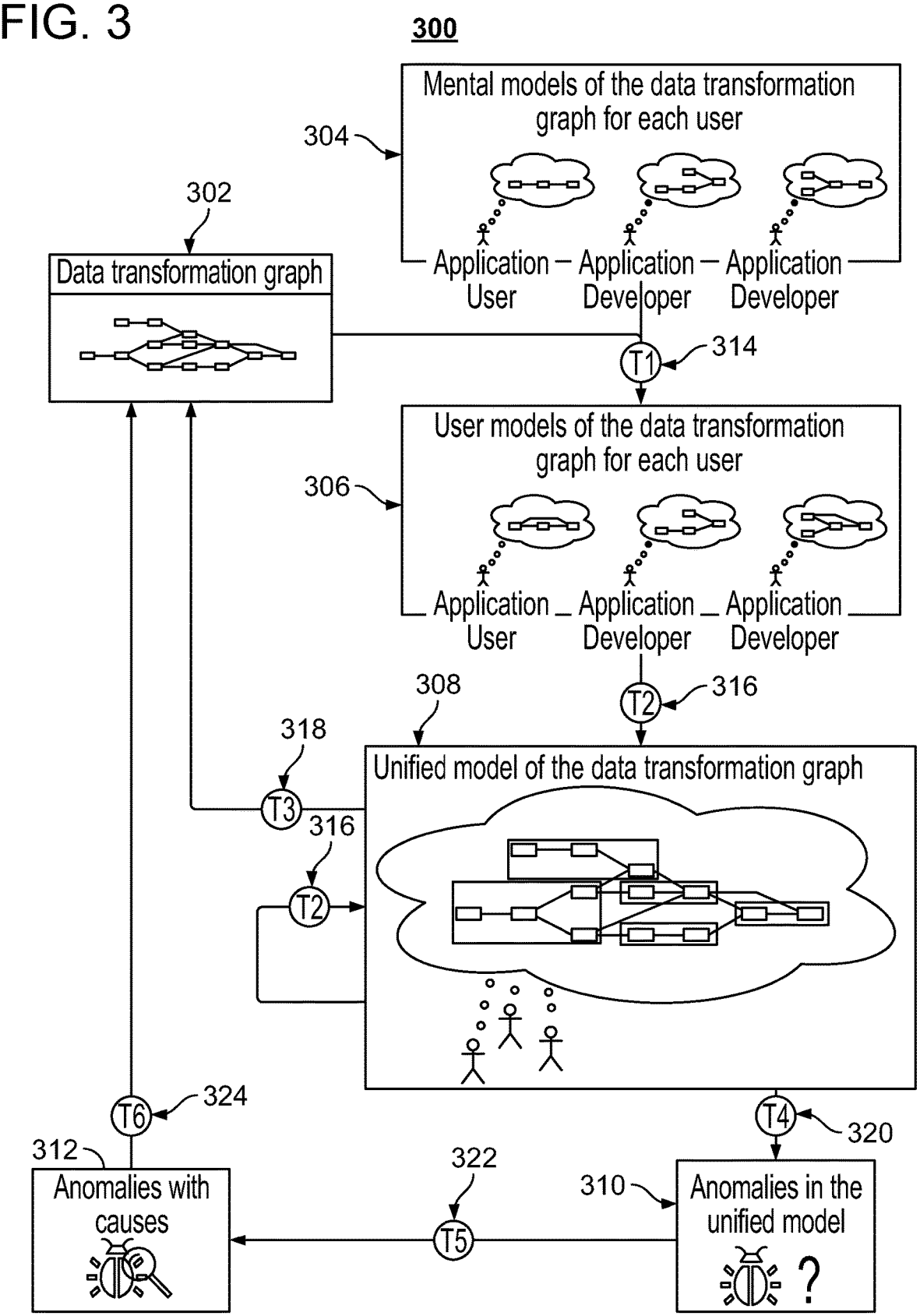
FIG. 3 shows a workflow for maintaining a data transformation graph, in accordance with one or more embodiments of the invention.

FIG. 3 shows a workflow 300 for maintaining a data transformation graph, in accordance with one or more embodiments. Workflow 300 will be described with continued reference to framework 200 of FIG. 2. Workflow 300 comprises various tasks performed using application 206 for maintaining data transformation graph 302. Workflow 300 enables a user (e.g., application developers 202 and application users 210) to understand a data transformation graph 302 or to explain data transformation graph 302 to other users. Enabling users to quickly understand data transformation graph 302 ensures reduction in the time it takes for a user to modify the data transformation graph 302.

Workflow 300 starts with each user (e.g., application developers 202 and application users 210) having their own mental model 304. Each mental model 304 is a representation of data transformation graph 302 in the mind of that user. At task T1 314, user models 306 of the data transformation graph 302 are created by each user interacting with a user interface to recreate their mental models 304 in application 206. In one embodiment, the user models 306 are modelled as graphs having nodes representing data operations and edges representing the flow of data between nodes. Each node may be represented by a table storing data.

At task T2 316, a unified model 308 of the data transformation graph 302 is created by a user interacting with the user interface based on the user models 306. In particular, the user models 306 are presented on the user interface. The presentation of user models 306 facilitates explanation of user models 306 to users in a step-by-step fashion, starting with an abstract overview and progressively describing more detail. Based on the presentation of user models 306, creation of unified model 308 is facilitated. Unified model 308 is a collective representation of data transformation graph 302 as understood by all of the users. Unified model 308 is modelled as a graph having nodes representing data operations and edges representing the flow of data between nodes. Each node may be represented by a table storing data. As shown in workflow 300, task T2 316 may be iteratively performed any number of times to allow users to repeatedly explain their created hierarchies 306 to other users.

At task T3 318, data transformation graph 302 may be modified by the users interacting with the user interface based on the unified model 308. The presentation of unified model 308 enables the users to make design decisions for modifying data transformation graph 302. For example, data transformation graph 302 may be modified by the users to improve data transformation graph 302, to update data transformation graph 302 according to updated requirements (e.g., of format and/or structure), etc.

At task T4 320, anomalies 310 in unified model 308 may be identified by the users. The anomalies 310 are represented as a set of anomalous rows causing unexplained behavior. In one embodiment, anomalies 310 are identified in unified model 308 by identifying topology anomalies in unified model 308. The identification of topology anomalies is enabled by the presentation of unified model 308 on the user interface. In one embodiment, anomalies 310 are identified in unified model 308 by detecting row changes in tables representing nodes in the unified model 308, which may be indicative of incorrect transformations. Detecting row changes may include, for example, detecting how many rows are removed in a transformation or detecting an amount of data supplication in a transformation. In one embodiment, anomalies 310 are identified in unified model 308 by inspecting dependencies of transformations in unified model 308. Inspecting dependencies of transformations may include, for example, detecting how a transformation combines or splits rows, detecting disjoint tables, and detecting where data of a table is used.

At task T5 322, a causality analysis may be performed by the users to identify the causes 312 of the anomalies 310. In one embodiment, the causality analysis is performed for the set of anomalous rows of the anomalies 310 by following anomalous rows to their origin or by decreasing the set of anomalous rows until a cause of the anomalies is found. Decreasing rows refers to filters applied to a table representing a node, thereby resulting in a decrease in the number of rows. The set of anomalous rows may be decreased based on values in one of the columns in the rows or based on their origin or destination.

At task T6 324, the anomalies 310 and their causes 312 may be compared with regular behavior of data transformation graph 302 to determine whether the anomalies 310 are to be corrected in data transformation graph 302. The comparison may comprise a selection (e.g., using selection history view 506 in FIG. 5 described below) as compared to the entire dataset of currently active nodes. The comparison may be performed by using the value frequencies view (e.g., value frequencies view 512 of FIG. 5) and origin and destination views (e.g., data origin view 510 and data destination view 514 of FIG. 5). If it is determined that the anomalies 310 are to be corrected, data transformation graph 302 may be modified to correct the anomalies 310.

Advantageously, the presentation of user models 306 and unified model 308 on a user interface facilitates maintenance of data transformation graph 302. For example, by enabling users to create user models 306, data transformation graph 302 may be modified according to specific purposes, such as, e.g., explaining graph topology to a user. Additionally, by allowing only a single unified model 308, users are forced to create a unified abstraction of data transformation graph 302. Further, visualizing user models 306 and unified model 308 enables users to modify data transformation graph 302, e.g., according to updated requirements or improvements identified by the users (at task T3 318) or to correct anomalies (at task T6 322).

Figure 4:
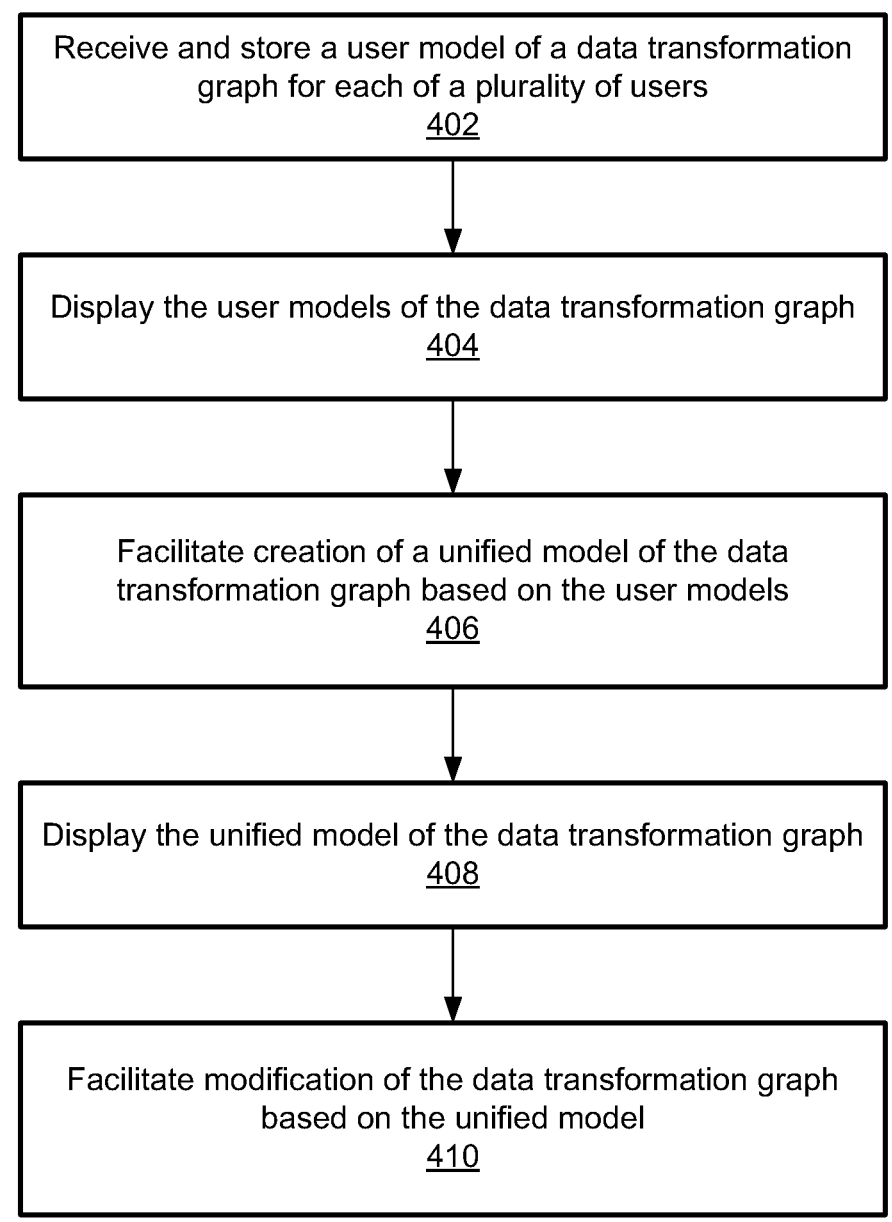
FIG. 4 shows a method for maintaining a data transformation graph, in accordance with one or more embodiments of the invention.

FIG. 4 shows a method 400 for maintaining a data transformation graph, in accordance with one or more embodiments. In one embodiment, the steps of method 400 may be performed by application 206 of FIG. 2 implemented on any suitable computing device, such as, e.g., computer 700 of FIG. 7. Method 400 will be described with continued reference to workflow 300 of FIG. 3.

At step 402, a user model of a data transformation graph is received and stored for each of a plurality of users (e.g., application developers and/or application users). In one embodiment, the user model may be user models 306 created from mental models 304 at task T1 314 in FIG. 3. The user model may be created based on input received from a user interacting with a user interface, such as, e.g., user interface 500 of FIG. 5 and user interface 600 of FIG. 6, described in further detail below. For example, a user may interact with a user interface to drag and drop nodes to create the user model.

At step 404, the user models of the data transformation graph for the plurality of users are displayed. Displaying the user models of the data transformation graph enables the users to explain their understanding of the data transformation graph. In one embodiment, the user models of the data transformation graph may be displayed on the user interface, as described in further detail below with respect to FIGS. 5 and 6.

At step 406, creation of a unified model of the data transformation graph is facilitated based on the user models. In one embodiment, the unified model may be unified model 308 created from user models 306 at task T2 316 of FIG. 3. The unified model of the data transformation graph may be created by a user interacting with the user interface. For example, based upon explanations of the displayed user models for one or more of the plurality of users, a user may create the unified model of the data transformation graph (e.g., by dragging and dropping nodes).

At step 408, the unified model of the data transformation graph is displayed. In one embodiment, the unified model of the data transformation graph may be displayed on the user interface, as described in further detail below with respect to FIGS. 5 and 6.

At step 410, modification of the data transformation graph is facilitated based on the unified model. In one embodiment, the data transformation graph may be modified at task T3 318 and/or task T6 322 of FIG. 3. In one embodiment, the data transformation graph may be modified by a user based upon design decisions facilitated by the displayed unified model, e.g., to improve the data transformation graph or to address updated format and structural requirements. In one embodiment, the data transformation graph is modified based upon anomalies in the data transmission graph identified by users using the displayed unified model.

Figure 5:
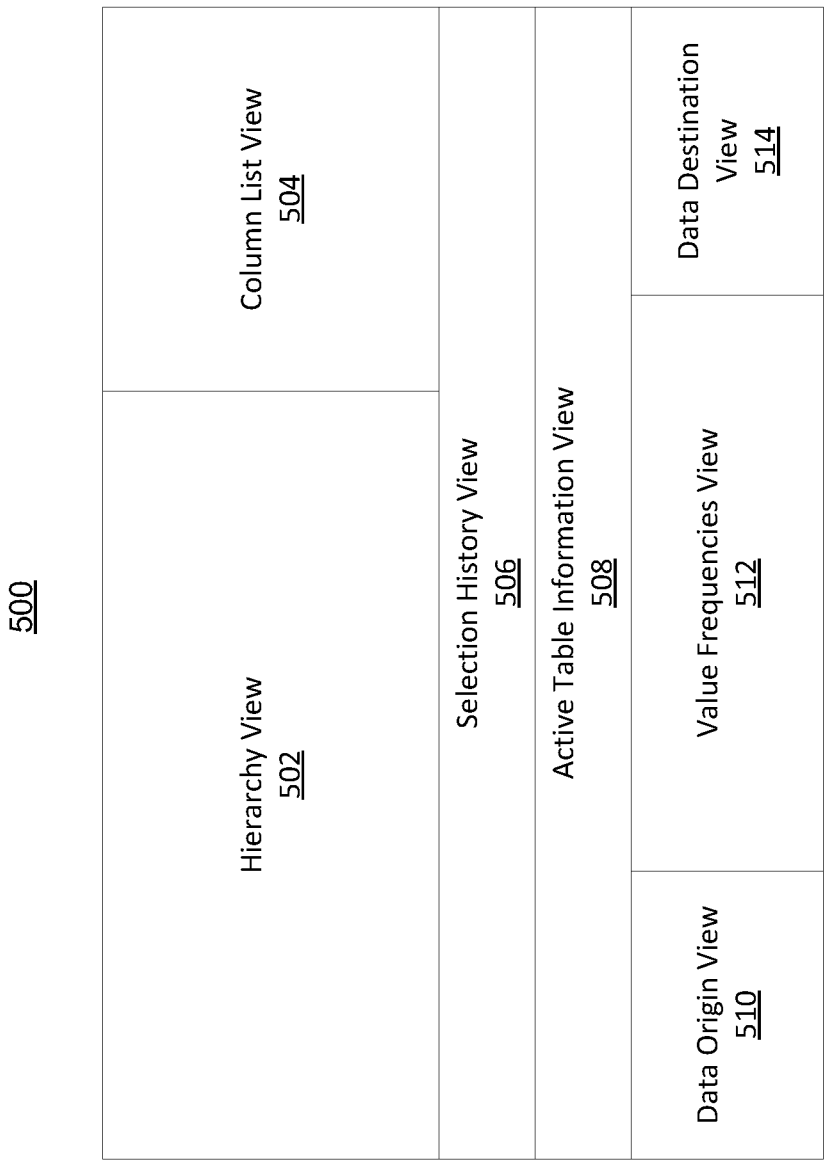
FIG. 5 shows a schematic view of a user interface for maintaining data transformation graphs, in accordance with one or more embodiments of the invention.

FIG. 5 shows a schematic view of a user interface 500 for maintaining data transformation graphs, in accordance with one or more embodiments. In one embodiment, user interface 500 may be the user interface utilized to present visualizations 212 in FIG. 2 and utilized in framework 300 of FIG. 3 and method 400 of FIG. 4. User interface 500 may be presented on a display device (e.g., display 710 of FIG. 7) and may be interacted with by one or more users using any suitable user interface (e.g., display 710, keyboard 712 and/or cursor control device 714 of FIG. 7). User interface 500 comprises a hierarchy view 502, a debugging view, and an interaction and selection view.

Hierarchy view 502 enables user interaction to create user models and/or unified models of data transformation graphs, e.g., by dragging and dropping nodes to create the user models and/or unified models. Hierarchy view 502 enables users to decrease complexity of a data transformation graph by aggregating a set of nodes into a single, more representative abstract representation of the nodes. Hierarchy view 502 also presents the created user models and/or unified models, which enables users to detect anomalies and perform causality analysis and to make design choices for modifying data transformation graphs, as described above with respect to workflow 300 of FIG. 3.

The debugging view comprises column list view 504, active table information view 508, data origin view 510, value frequencies view 512, and data destination view 514. The debugging view enables users to identify anomalies in the unified models of data transformation graphs. For example, the debugging view may enable users to perform a dependency analysis by enabling the users to inspect row dependencies of a table. In another example, the debugging view may enable users to perform a causality analysis by enabling the users to trace rows through multiple transformations or analyze column values. The debugging view also enables users to select rows and to analyze anomalies in the number of rows. Column list view 504 presents columns of an active table. Column list view 504 and value frequencies view 512 enable users to perform a column analysis. Value frequencies view 512 provides a summary of the currently selected table. In one embodiment, value frequencies view 512 may show bar charts comprising the frequency of values (e.g., how often a certain value occurred in a set of columns. Active table information view 508 presents the total number of rows of the active table, and links the active table in the hierarchy view 502 to the debugging view. Data origin view 510 and data destination view 514 show row dependencies (e.g., in and out dependencies) of the active table.

The interaction and selection view comprises selection history view 506, which enables users to interact with visualizations. For example, users can navigate through user models and/or unified models by panning, zooming, and opening and closing groups. Selection history view 506 enables users to select portions of data that will be used for identifying anomalies (e.g., by performing a causality analysis). Such user selections may comprise a set of actions and/or filters users may apply on their data transformation graph. Since selections may be complex, selection history view 506 provides a summary of the current selection. Additionally, after detecting the cause of an anomaly, selection history view 506 enables the comparison of the detected anomaly to regular behavior.

Figure 6:
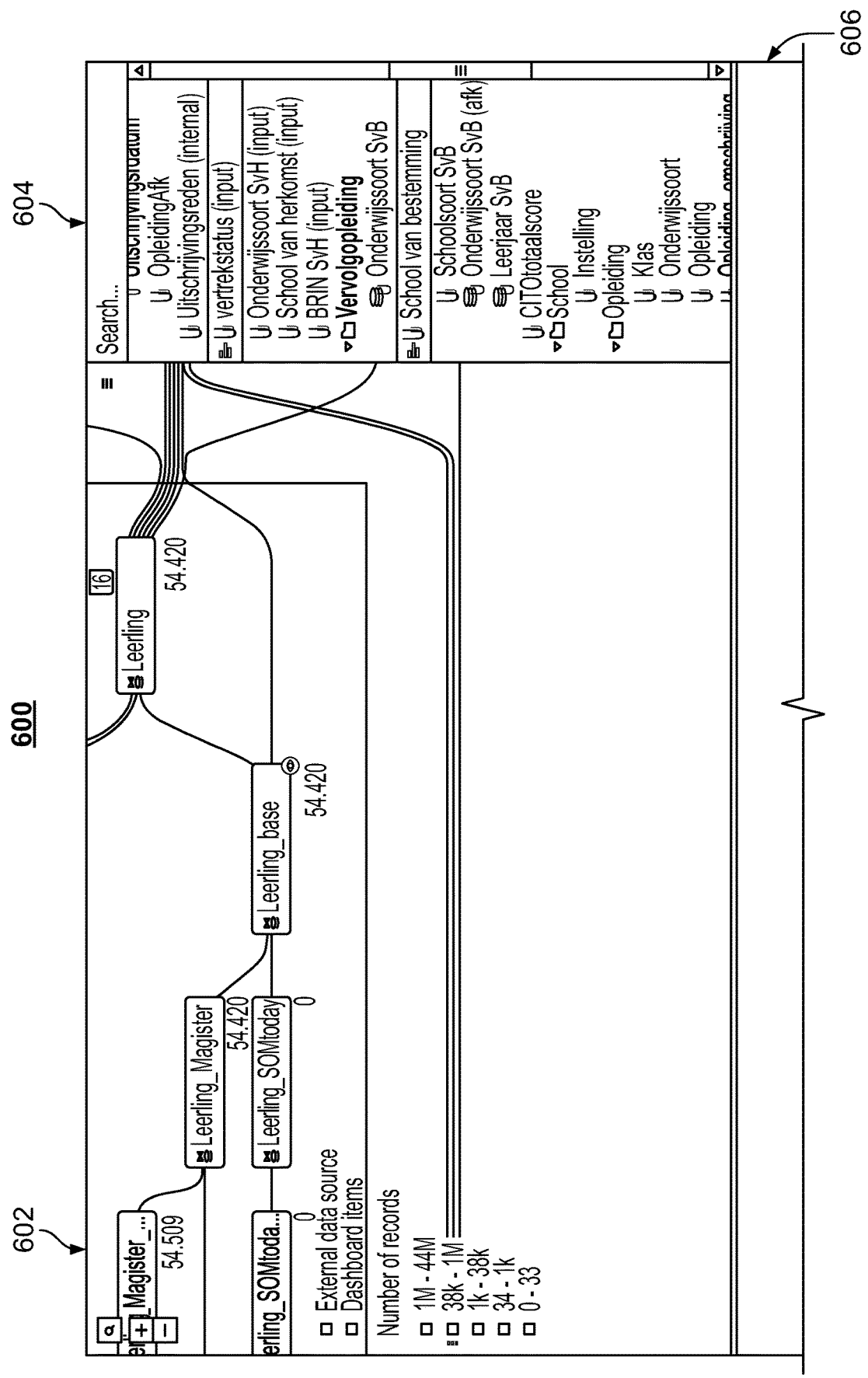
FIG. 6 shows an exemplary user interface for maintaining a data transformation graph, in accordance with one or more embodiments of the invention.
Figure 6:
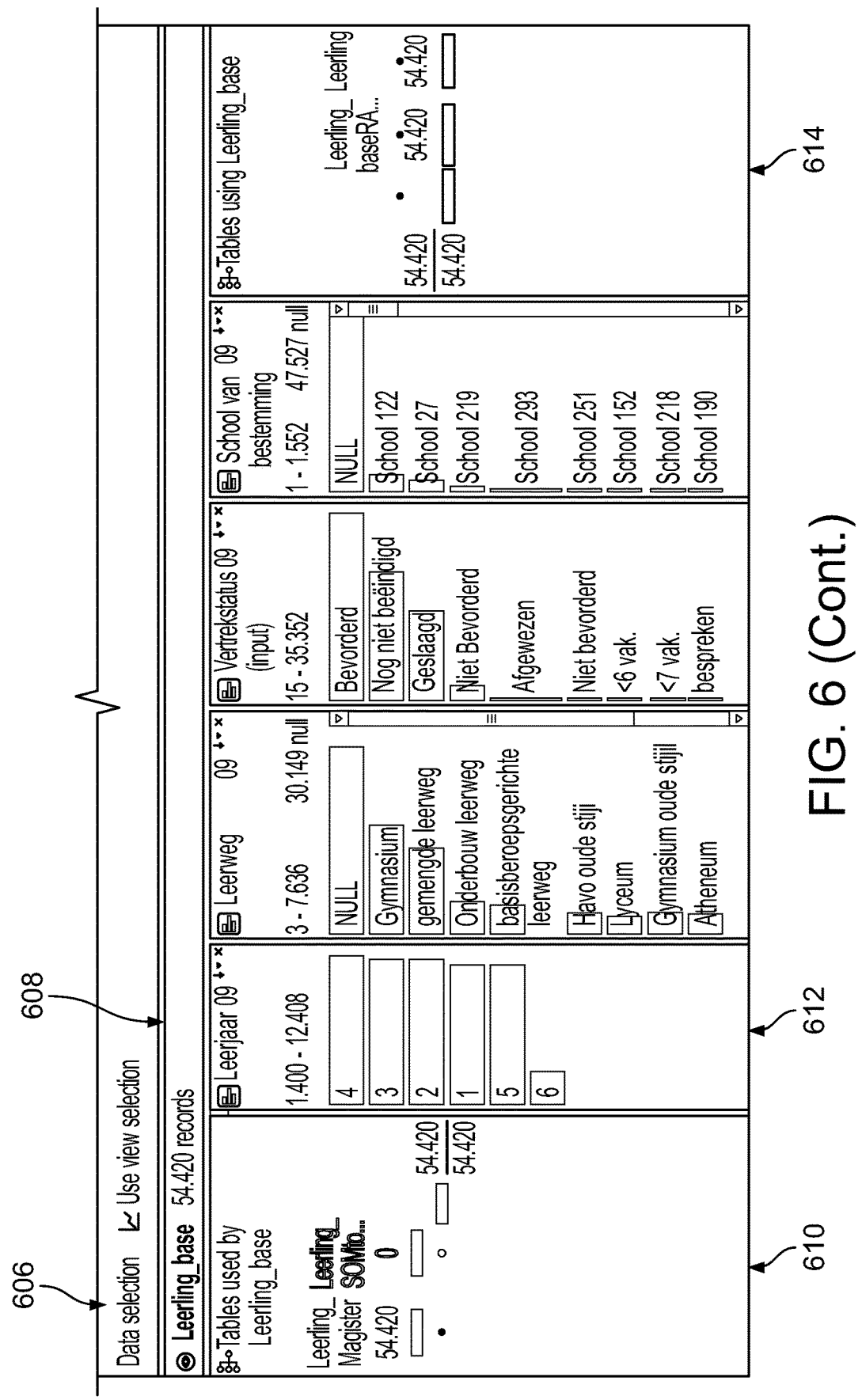

FIG. 6 shows an exemplary user interface 600 for maintaining a data transformation graph, in accordance with one or more embodiments. User interface 600 may be presented on a display device (e.g., display 710 of FIG. 7) and may be interacted with by one or more users using any suitable user interface (e.g., display 710, keyboard 712 and/or cursor control device 714 of FIG. 7). User interface 600 comprises hierarchy view 602, column list view 604, selection history view 606, active table information view 608, data origin view 610, value frequencies view 612, and data destination view 614.

Figure 7:
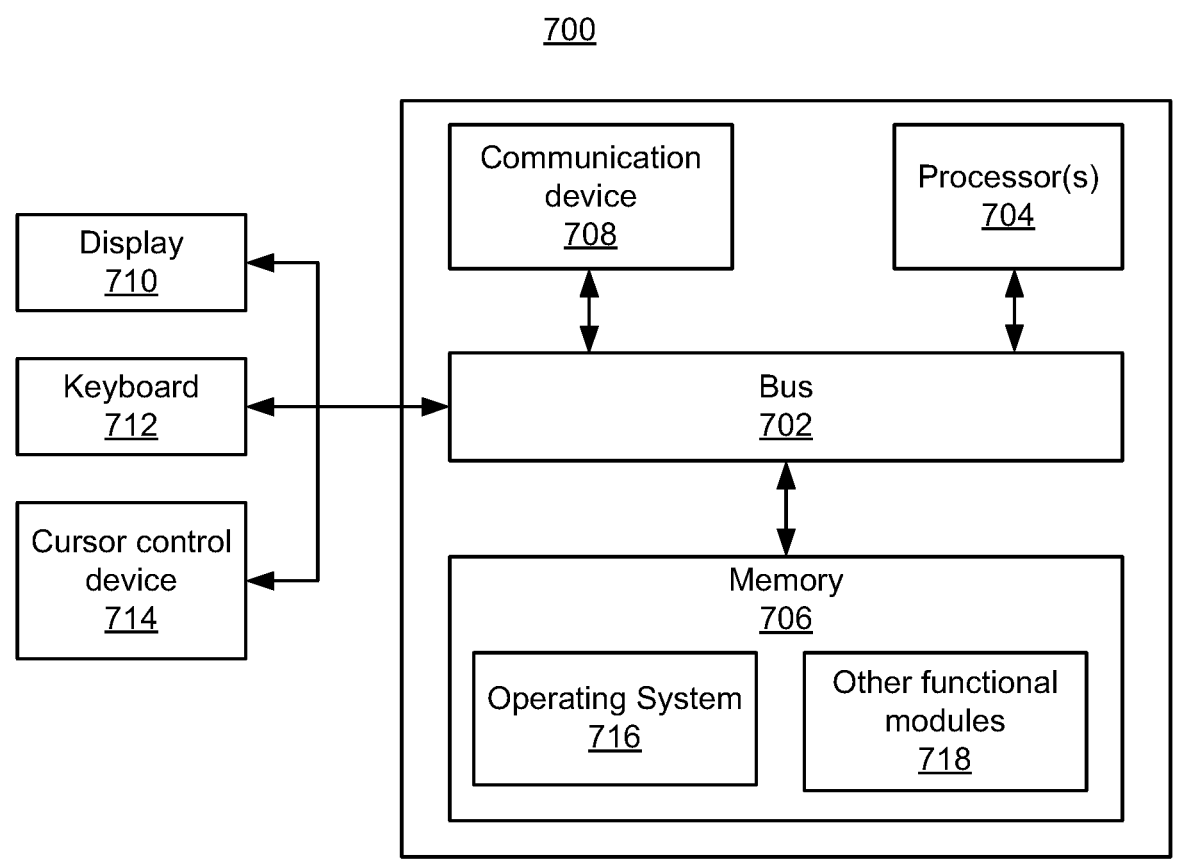
FIG. 7 is a block diagram of a computing system according to an embodiment of the invention.

FIG. 7 is a block diagram illustrating a computing system 700 configured to execute the methods, workflows, and systems described herein. For example, computing system 700 may be used to implement framework 200 of FIG. 2, workflow 300 of FIG. 3, method 400 of FIG. 4, user interface 500 of FIG. 5, and user interface 600 of FIG. 6. In some embodiments, computing system 700 may be one or more of the computing systems depicted and/or described herein. Computing system 700 includes a bus 702 or other communication mechanism for communicating information, and processor(s) 704 coupled to bus 702 for processing information. Processor(s) 704 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 704 may also have multiple processing cores, and at least some of the cores may be configured to perform specific functions. Multi-parallel processing may be used in some embodiments.

Computing system 700 further includes a memory 706 for storing information and instructions to be executed by processor(s) 704. Memory 706 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 704 and may include volatile media, non-volatile media, or both. The media may also be removable, non-removable, or both.

Additionally, computing system 700 includes a communication device 708, such as a transceiver, to provide access to a communications network via a wireless and/or wired connection according to any currently existing or future-implemented communications standard and/or protocol.

Processor(s) 704 are further coupled via bus 702 to a display 710 that is suitable for displaying information to a user. Display 710 may also be configured as a touch display and/or any suitable haptic I/O device.

A keyboard 712 and a cursor control device 714, such as a computer mouse, a touchpad, etc., are further coupled to bus 702 to enable a user to interface with computing system. However, in certain embodiments, a physical keyboard and mouse may not be present, and the user may interact with the device solely through display 710 and/or a touchpad (not shown). Any type and combination of input devices may be used as a matter of design choice. In certain embodiments, no physical input device and/or display is present. For instance, the user may interact with computing system 700 remotely via another computing system in communication therewith, or computing system 700 may operate autonomously.

Memory 706 stores software modules that provide functionality when executed by processor(s) 704. The modules include an operating system 716 for computing system 700 and one or more additional functional modules 718 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for creating a unified model of a data transformation graph, comprising:
    receiving and storing a user model for each user of a plurality of users, each of the user models being a user-specific representation of the same data transformation graph, the data transformation graph for transforming data into a particular format or structure;
    facilitating creation of a unified model of the data transformation graph based on the user models;

displaying the unified model of the data transformation graph; and receiving user input for modifying the data transformation graph based on the displayed unified model.

2. The computer-implemented method of claim 1, wherein displaying the unified model of the data transformation graph comprises:

displaying a column list of a table for a selected node of the unified model, a summary of information available in the table, data origin and data destination information of the table, and value frequencies of the table.

3. The computer-implemented method of claim 1, wherein facilitating creation of a unified model of the data transformation graph based on the user models comprises:

displaying the user models.

4. The computer-implemented method of claim 3, wherein displaying the user models comprises:

displaying a column list of a table for a selected node of the user models, a summary of information available in the table, data origin and data destination information of the table, and value frequencies of the table.

5. The computer-implemented method of claim 1, wherein receiving and storing a user model for each user of a plurality of users comprises:

creating the user model of the data transformation graph for each respective user based on user input from the respective user.

6. The computer-implemented method of claim 1, wherein facilitating creation of a unified model of the data transformation graph based on the user models comprises:

creating the unified model of the data transformation graph based on user input from one or more of the plurality of users.

7. An apparatus for creating a unified model of a data transformation graph, comprising:

a memory storing computer instructions; and at least one processor configured to execute the computer instructions, the computer instructions configured to cause the at least one processor to perform operations of:

receiving and storing a user model for each user of a plurality of users, each of the user models being a user-specific representation of the same data transformation graph, the data transformation graph for transforming data into a particular format or structure;

facilitating creation of a unified model of the data transformation graph based on the user models;

displaying the unified model of the data transformation graph; and receiving user input for modifying the data transformation graph based on the displayed unified model.

8. The apparatus of claim 7, wherein displaying the unified model of the data transformation graph comprises:

displaying a column list of a table for a selected node of the unified model, a summary of information available in the table, data origin and data destination information of the table, and value frequencies of the table.

9. The apparatus of claim 7, wherein facilitating creation of a unified model of the data transformation graph based on the user models comprises:

displaying the user models.

10. The apparatus of claim 9, wherein displaying the user models comprises:

displaying a column list of a table for a selected node of the user models, a summary of information available in the table, data origin and data destination information of the table, and value frequencies of the table.

11. The apparatus of claim 7, wherein receiving and storing a user model for each user of a plurality of users comprises:

creating the user model of the data transformation graph for each respective user based on user input from the respective user.

12. The apparatus of claim 7, wherein facilitating creation of a unified model of the data transformation graph based on the user models comprises:

creating the unified model of the data transformation graph based on user input from one or more of the plurality of users.

13. A non-transitory computer-readable medium storing computer program instructions for creating a unified model of a data transformation graph, the computer program instructions, when executed on at least one processor, cause the at least one processor to perform operations comprising:

receiving and storing a user model for each user of a plurality of users, each of the user models being a user-specific representation of the same data transformation graph, the data transformation graph for transforming data into a particular format or structure;

facilitating creation of a unified model of the data transformation graph based on the user models;

displaying the unified model of the data transformation graph; and receiving user input for modifying the data transformation graph based on the displayed unified model.

14. The non-transitory computer-readable medium of claim 13, wherein displaying the unified model of the data transformation graph comprises:

displaying a column list of a table for a selected node of the unified model, a summary of information available in the table, data origin and data destination information of the table, and value frequencies of the table.

15. The non-transitory computer-readable medium of claim 13, wherein facilitating creation of a unified model of the data transformation graph based on the user models comprises:

displaying the user models.

16. The non-transitory computer-readable medium of claim 13, wherein receiving and storing a user model of a data transformation graph for each of a plurality of users comprises:

creating the user model of the data transformation graph for each respective user based on user input from the respective user.

17. The non-transitory computer-readable medium of claim 13, wherein facilitating creation of a unified model of the data transformation graph based on the user models comprises:

creating the unified model of the data transformation graph based on user input from one or more of the plurality of users.

\* \* \* \* \*